Dec. 23, 1952    J. P. CARR    2,622,436
APPARATUS FOR BALANCING WHEELS
Filed Aug. 13, 1949    7 Sheets-Sheet 1

INVENTOR
JAMES P. CARR
BY
ATTORNEY

Dec. 23, 1952 J. P. CARR 2,622,436
APPARATUS FOR BALANCING WHEELS
Filed Aug. 13, 1949 7 Sheets-Sheet 2

Fig. 3.

INVENTOR
JAMES P. CARR
BY
ATTORNEY

Dec. 23, 1952  J. P. CARR  2,622,436
APPARATUS FOR BALANCING WHEELS
Filed Aug. 13, 1949  7 Sheets-Sheet 3

Fig. 4.

INVENTOR
JAMES P. CARR
BY
ATTORNEY

Dec. 23, 1952 J. P. CARR 2,622,436
APPARATUS FOR BALANCING WHEELS
Filed Aug. 13, 1949 7 Sheets-Sheet 5

INVENTOR
JAMES P. CARR
BY

ATTORNEY

Dec. 23, 1952  J. P. CARR  2,622,436
APPARATUS FOR BALANCING WHEELS
Filed Aug. 13, 1949  7 Sheets-Sheet 6

INVENTOR
JAMES P. CARR
BY
ATTORNEY

Dec. 23, 1952   J. P. CARR   2,622,436
APPARATUS FOR BALANCING WHEELS
Filed Aug. 13, 1949   7 Sheets-Sheet 7

INVENTOR
JAMES P. CARR
BY
ATTORNEY

Patented Dec. 23, 1952

2,622,436

UNITED STATES PATENT OFFICE 2,622,436

APPARATUS FOR BALANCING WHEELS

James P. Carr, Lansing, Mich., assignor to Food Machinery and Chemical Corporation, San Jose, Calif., a corporation of Delaware Application August 13, 1949, Serial No. 110,210

12 Claims. (Cl. 73—66)

This invention relates to the art of balancing bodies subject to rotation about a given axis, and is particularly useful in correcting the balance of automotive wheels.

It is an object of this invention to provide a simplified apparatus, the accurate operation of which does not require a high degree of skill and by which the operator may readily ascertain the plane in which dynamic unbalance exists in a wheel and the amount of weight necessary to be added to the wheel in said plane to dynamically balance said wheel.

The manner of accomplishing the foregoing object as well as further objects and advantages will be made manifest in the following description taken in connection with the accompanying drawings in which.

Referring specifically to the drawings, the invention is shown therein as embodied in a wheel balancer 20 the frame of which comprises a heavy sheet metal shell 21 including end walls 22 and 23, side walls 24 and 25, partition wall 26 and a top wall 27. The top wall 27 has a turret 28 provided thereon. The shell 21 also has a floor 29 which is disposed a substantial distance upwardly from the bottom thereof.

The wall 23 has openings 35 and 36, there being a bearing mounting 37 fixed to said wall about opening 35, this mounting having self-aligning ball bearing 38 provided therein. Extending snugly through the inner race of said bearing and fixed against endwise movement therein by rings 39 located in annular grooves 40 is a shaft 41.

Mounted on the shaft 41 just outside the bearing 38 and secured thereto as by a Woodruff key 42 is a brake drum 43, the periphery of the latter being annularly recessed to receive a rubber-band tread 44.

Mounted on the bearing mount 37 and disposed within the drum 43 is a brake shoe 45, this being expansible within the drum to apply a braking action thereto, in a manner well known in the art, by depressing a lever 46.

Fixed on the floor 29 are bearings 50 carrying a rod 51 on which a motor mount 52 is pivotally supported. Fixed on this mount is a motor 53, the shaft 54 of which extends through the wall hole 36 and has fixed thereon a drive pinion pulley 55 which is closely spaced from the rubber tread 44 of the brake drum 43. The motor mount 52 is adapted to be rocked about the rod 51 in a well known manner by manipulating a lever 56 to lift the motor 53 from the position in which this is shown in Fig. 3, while said motor is energized and the pulley 55 thus rotating, so as to press this pulley against the rubber tread 44 and thereby rotate the drum 43 and the shaft on which it is fixed.

The end of the shaft 41 adjacent to the brake drum 43 is provided with threads 57 which are adapted for use in mounting a rubber-tired automotive wheel 58 in the well known manner in which said wheel is rigidly fixed on said shaft while concentric therewith.

Figure 3:
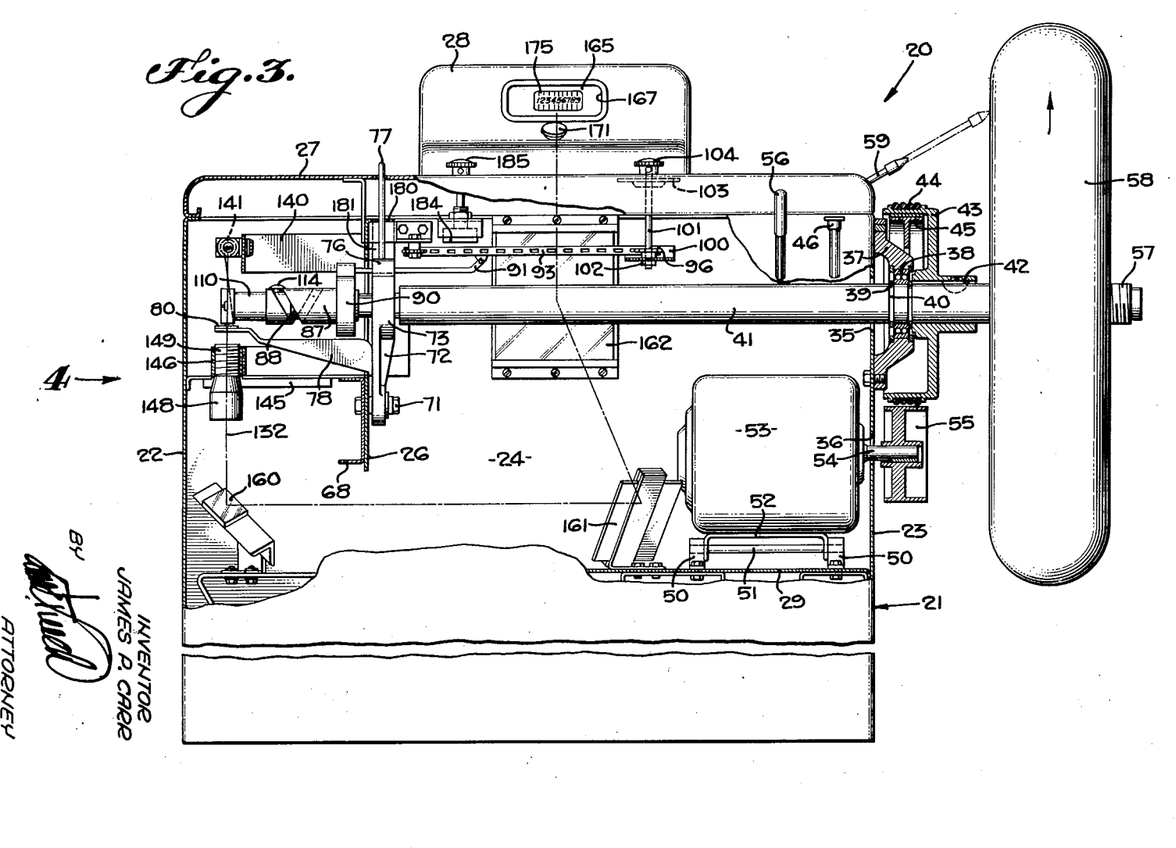
Fig. 3 is a side elevational view of Fig. 1 partially broken away to illustrate certain features of the structure.

Mounted in the shell top 27 and slideable along its own axis so as to be manually extensible or retractable, as indicated in Fig. 3, is a pointer 59. When this pointer is extended as shown in broken lines in this view, it contacts the wheel 58 in a vertical plane including the axis of shaft 41.

The opposite end of the shaft 41 is turned down (see Fig. 5) to provide sections 65, 66, and 67, of progressively decreasing diameter.

The partition wall 26 is re-enforced by a channel shaped sheet metal member 68 and has an opening 69 through which the left hand end of shaft 41 extends. Disposed just inwardly from the wall 26 and pivotally mounted on a ball bearing 70 fixed to said wall by a bolt 71, is a free swinging arm 72 having a boss 73 on its upper end. Mounted in said boss is a self-aligning bearing 74, into the inner race of which the shaft section 65 slidably fits. The boss 73 is provided with a horizontal hole 75 which is parallel with the axis of the bearing 70. This boss also has, extending upwardly therefrom, a lug 76 from which a vibration indicator rod 77 extends upward to protrude through a suitable hole in the shell top wall 27.

Figure 8:
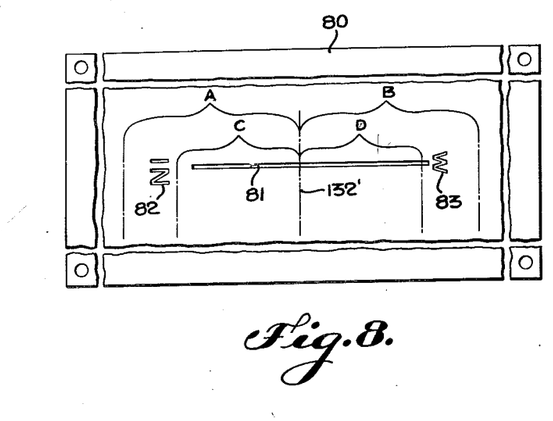
Fig. 8 is a highly magnified view of the shutter aperture plate of the invention indicating by brackets the different portions of the aperture which are illuminated during four different positions of the shutter.

Fixed on the arm 72 and extending through the opening 69 in the wall 26 is a bracket 78 the tip of which is provided with a slot 79 and has mounted thereon an aperture plate 80. This plate (see Fig. 8) is made of very thin sheet metal and has etched therein an aperture 81 which is about one-quarter inch long and is disposed parallel with the axis of the shaft 41 when the arm 72 is vertical. Aperture 81 has a "medial" or "locating" indicia 82 on its outer end which comprises the word "in," and an "extreme" or "measuring" indicia 83 on its inner end, which comprises the letter "W."

The shaft section 66 has flat faces 84 whereby a shutter control sleeve 87 slidably mounted thereon has a splined relation with said shaft. This sleeve has a helical slot 88 and a ball bearing 89 the inner race of which is fixed to said sleeve and the outer race of which is fixed to a ring 90 having a rod 91 which extends through the hole 75 in the arm 72 and connects at 92 to a perforated steel band or chain 93 which is trained around three sprockets 94, 95, and 96. The sprocket 94 is carried on a bracket 97 which is secured to the wall 26. The sprocket 95 is mounted on a cross frame member 100 (see Fig. 4). The sprocket 96 is mounted (Figs. 3 and 4) on a rod 101 which journals in a bearing 102 provided on the member 100 and in a bearing 103 provided on the top wall 27 and has an operating knob 104 fixed upon its upper end. By rotating this knob, the rod 91, the ring 90, and the sleeve 87 may be shifted axially.

A shutter 110 (Fig. 5) is provided, having a body 111, a head 112, and a cap 113. The body 111 is bored so as to rotatively receive the shaft section 67 and slidably extends within the outer end portion of the sleeve 87. The body 111 is provided with a suitable tapped hole to receive a screw 114 for supporting a roller 115 which lies in the helical slot 88 in the sleeve 87.

Figures 5, 6:
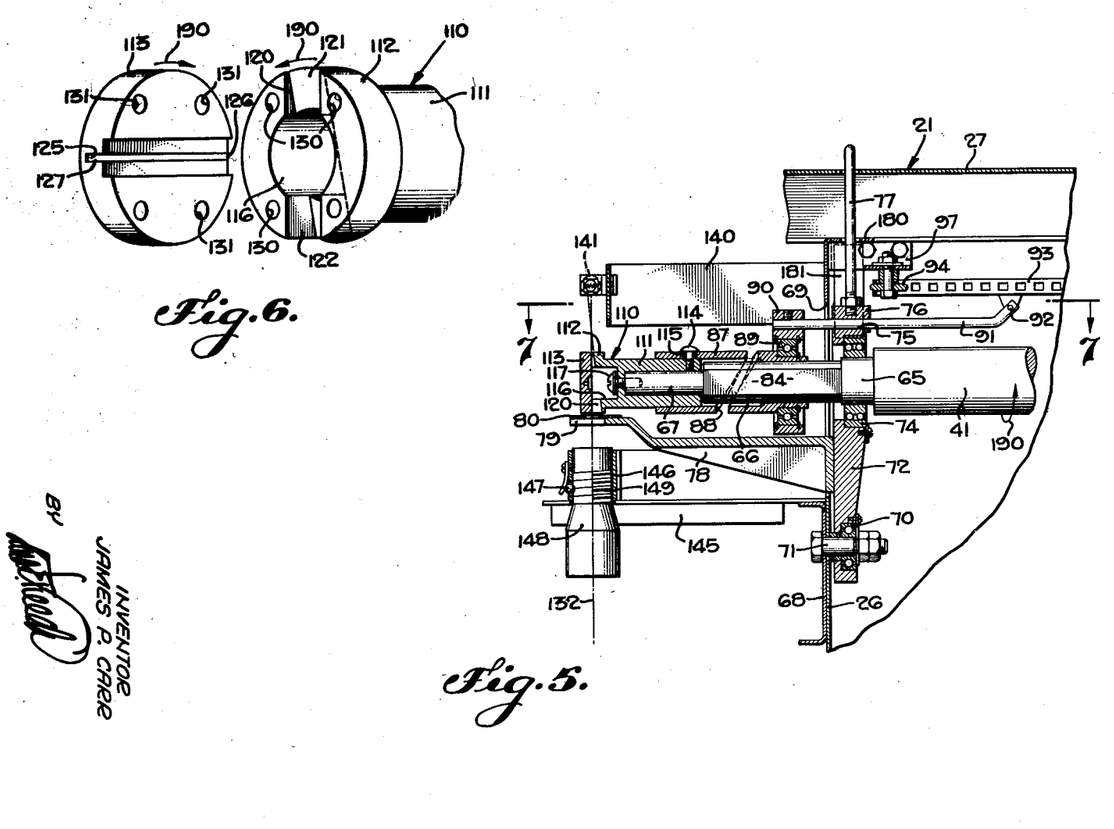
Fig. 5 is a vertical sectional view taken on the line 5—5 of Fig. 4 and illustrating the improved light shutter of the invention.
Fig. 6 is an enlarged diagrammatic perspective view of the shutter head with the cap thereof removed and with those elements angled away from each other to show the internal construction thereof.

The head 112 has a bore 116 in which a screw 117 is disposed which extends through a suitable axial hole in the shutter body 111 and is screwed into a tapped hole provided to receive the same screw in shaft section 67 so as to retain shutter 110 on said shaft section in a rotatable relation therewith although preventing endwise movement relative thereto. Thus when the sleeve 87 is shifted endwise, the roller 115 mounted on the shutter 110 in the slot 88 causes the shutter to rotate relative to the shaft 41, whereby the rotative relation between the shutter 110 and the shaft 41 is controlled by rotation of the knob 104.

Formed in the shutter head 112 (Fig. 6) is a tapering diametral slot 120 which has a narrow opening 121 at one end, and a wide opening 122 at the opposite end.

The shutter cap 113 has a tapered diametral slot 125 having a narrow opening 126 at one end and a wide opening 127 at the opposite end. The slot 125 is much narrower than the slot 120 but is widened out throughout its length to the same width as slot 120 and to a depth equal to that of the narrow slot end 126.

The head 112 is provided with tapped holes 130 and the cap 113 has holes 131 which are in alignment with holes 130 the cap being secured onto the head 112 by screws extending through holes 131 and into the holes 130. These holes are so located that when the cap is thus assembled on the head, the slots 120 and 125 are located at right angles with each other. The plane 132 of the meeting faces of the head 112 and cap 113 is at right angles to the axis of the shaft 41. The intersection of this plane with the aperture plate 80 is indicated in Fig. 3 by a line 132'.

Supported on a bracket 140 fixed on the wall 26 is an electric lamp 141 the filament of which is bisected by the plane 132, this filament also lying in the vertical plane containing the axis of the bearing 70. Secured at its opposite ends to the wall 26 and the end wall 22 is a sheet metal fitting 145 providing a receptacle 146 having a spring detent 147 into which receptacle a projection lens assembly 148 having threads 149 is adapted to be screwed. The lens assembly 148, thus mounted, is in vertical alignment with the filament of the lamp 141. Focusing of the lens assembly 148 is accomplished by screwing same back and forth in the receptacle 146, the detent 147 lodging in one of the threads 149 to accomplish the screwing action and to retain the lens assembly in its proper adjusted position.

As shaft 41 rotates, the lamp 141 is adapted to direct a beam of light successively through the slots 120 and 125, through the aperture 81 and downwardly through the lens assembly 148 in a substantially vertical direction. Mounted on the floor 29 in the path of this beam is a mirror 160. This mirror is angled to reflect said beam onto a mirror 161 also mounted on the floor 129, said beam being reflected therefrom onto a mirror 162 which is mounted on the side wall 24 (Figs. 3 and 4).

Figure 2:
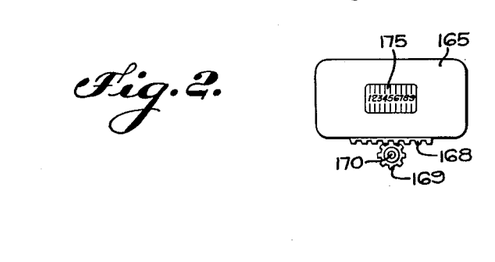
Fig. 2 is a diagrammatic plan view of a scanning chart illustrating the manner in which this is adjustable longitudinally.

Mirror 162 is so angled as to deflect the reflected beam therefrom onto a scanning screen 165 which is slidably mounted in guides 166 provided on the inner face of the turret 28 opposite a window 167 in said turret through which said screen 165 may be viewed. As shown in Fig. 2 the scanning screen 165 is provided with a rack 168 which meshes with a gear 169 which is provided on the lower end of a pin 170 which journals in a hole provided in the turret 28 and has fixed on its upwardly extending end a knob 171, by the rotation of which the screen 165 may be shifted longitudinally in its guides 166. Printed on the scanning screen 167 is a calibrated scale 175.

Figure 4:
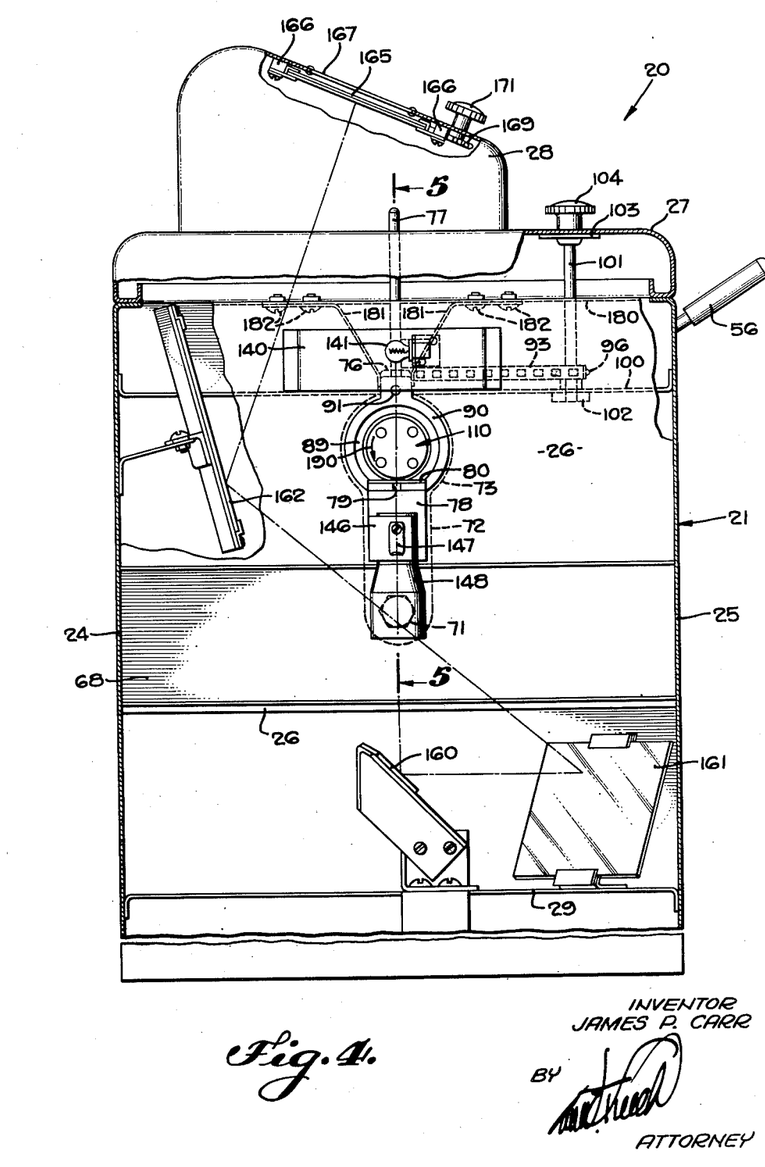
Fig. 4 is an enlarged end elevational view, taken in the direction of arrow 4 in Fig. 3, which is partially broken away to illustrate normally hidden portions of the structure.
Figure 7:
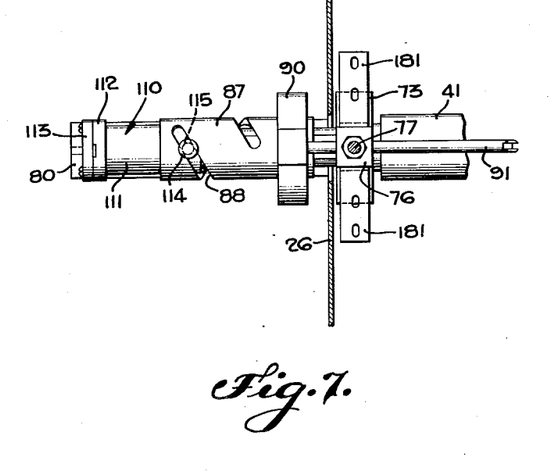
Fig. 7 is a plan view of the shutter mechanism of the invention taken on the line 7—7 of Fig. 5.

Referring to Figs. 4, 5 and 7, the wall 26 carries, on a flange 180 horizontally bent from the upper edge thereof, a pair of leaf springs 181 which are secured in place by screws 182, the lower ends of these springs embracing opposite faces of the lug 76 so as to yieldably centralize the arm 72 in vertical position, which is to say, with the axis of the shaft 41 in the same vertical plane as the axis of the bearing 70.

*Operation*

A switch 184 actuated by a knob 185 is adapted to energize a vibrator (not shown but which is mounted on the shell 21) when this knob is turned to one position, and to shut off said vibrator and energize the motor 53 and electric lamp 141 when said knob is turned to another position.

Figure 1:
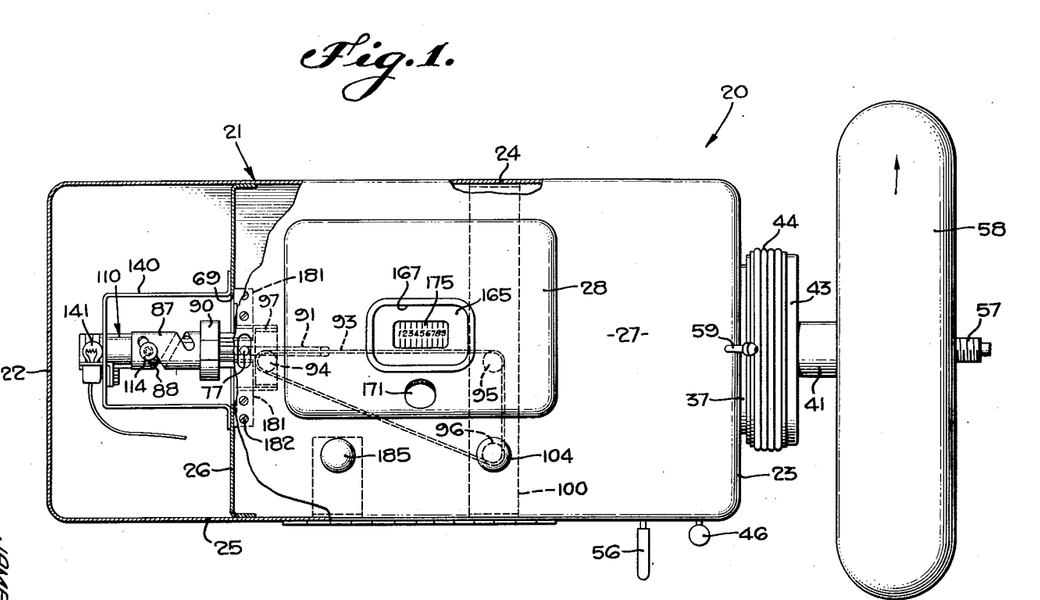
Fig. 1 is a plan view of a preferred embodiment of the invention partially broken away to illustrate details of the structure.

The first step in balancing wheel 58 after the latter has been concentrically fixed on shaft 41, as shown in Fig. 1, is to start said vibrator and, by trial and error, fix such balancing weights on the rim of said wheel as will cause it to stand still in any position that it is stopped and left free to rotate on its axis.

With the wheel 58 thus statically balanced, the lever 56 is momentarily depressed to make a drive connection between the motor 53 and brake drum 43, which connection is maintained until the wheel 58 has been accelerated to approximately 850 R. P. M. The lever 56 is then released, allowing the wheel 58 and shaft 41 to spin freely.

Figure 9:
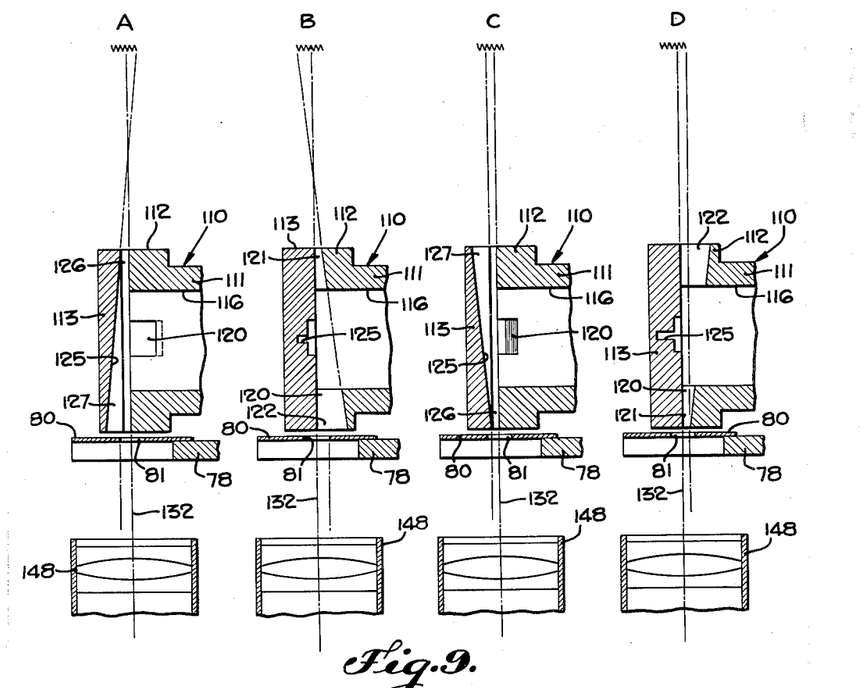
Fig. 9 is a composite diagram showing the shutter of the invention in said four positions thereof spaced different multiples of 90° apart and indicated by the letters A, B, C and D.

Assuming the wheel 58 is dynamically out of balance it is said to have a dynamic unbalance couple. Static balance having already been attained, the only thing remaining to be done is to ascertain the plane of the dynamic unbalance couple, and the amount of weight necessary to apply at the edge of the rim at opposite points on the wheel in said plane to offset this dynamic unbalance couple in order to permit a correction to be made which will bring the wheel into dynamic balance. This is done as follows:

Fig. 9 illustrates how various portions A, B, C, and D of the aperture 81 are illuminated with the shaft 41 turning and with various end openings of the slots 120 and 125 disposed downwardly opposite this aperture. The brackets in Fig. 8 indicate the portion of aperture 81 indicated by each of these letters and which is illuminated with the shutter 110 positioned as shown in each of the lettered views in Fig. 9.

The light beam resulting from this illumination in each instance and reflected by the system of mirrors 160—161—162 onto the scanning screen 165 is turned by this series of deflections so as to produce an image like the portion of the aperture 81 thus illuminated which is parallel with the calibrations on said screen.

Figure 10:
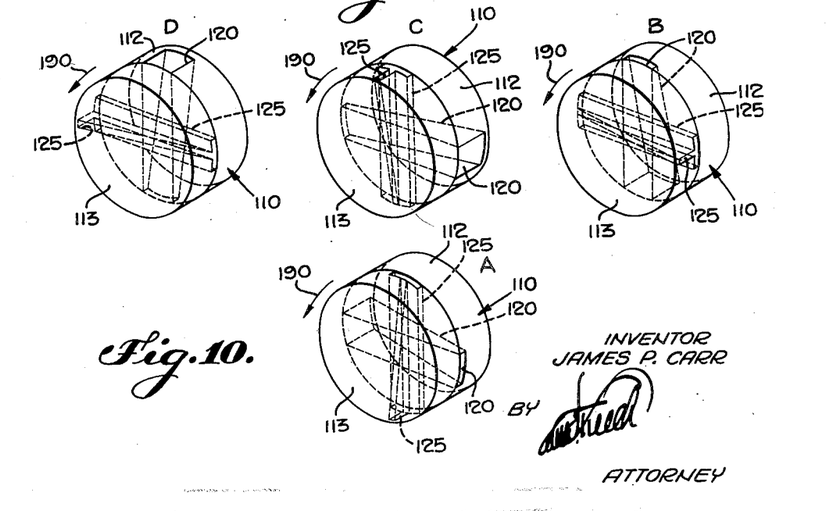
Fig. 10 is a composite view illustrating in perspective said four different positions of the shutter.
Figure 11:
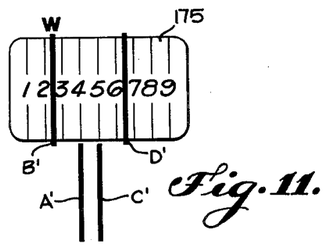
Fig. 11 is a diagrammatic view illustrating a pattern of light images superimposed on the measuring chart such as generally occurs in an initial stage of the operation of determining the plane of unbalance in a wheel and the size of counter weights necessary to apply to said wheel in said plane to correct the balance of said wheel.

The images thus produced immediately after the wheel 58 has been accelerated as aforesaid, may be substantially as these appear in Fig. 11. In this view the letters A', B', C', and D' are applied to the representations of said images, it being understood that these images are produced by the shutter 110 being disposed in the correspondingly lettered positions illustrated in Figs. 9 and 10. The fact that images A' and C' are not superimposed in Fig. 11 indicates that the slot 125 is not in a vertical plane containing the axis of the bearing 70 when these images are formed. In other words the axis of the shaft 41 at the moment each of these images is formed is not in its medial position located equally between opposite extremes of the amplitude of oscillation, to which the shaft is subjected in substantially a horizontal plane by the dynamic unbalance couple present in the wheel 58.

The spacing of the images A' and C' in Fig. 11 also indicates that the images B' and D' are being produced by light passing through the slot 120 when the axis of the shaft 41 is not located at the extremities of its oscillation.

Figure 12:
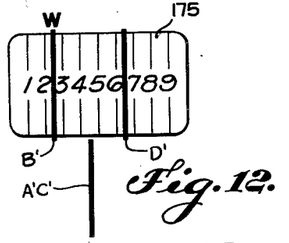
Fig. 12 is a view similar to Fig. 11 illustrating another pattern of images such as may be produced in the stage immediately following that illustrated in Fig. 11.

The preferable mode of locating the plane in which the dynamic unbalance couple exists, is to put the slot 125 in said plane. This is done by rotating the knob 104 which, by shifting the sleeve 87 longitudinally, turns the shutter 110 relative to the shaft 41 while the latter is rotating. This rotational adjustment of the shutter 110 relative to shaft 41 changes the precise moment in the oscillation of the shaft 41 at which each of the images A', B', C' and D' is flashed onto the scanning screen. When the images A' and C' are thus brought into coincidence as shown in Fig. 12 by this rotational adjustment, it is apparent that the slot 125 lies in a vertical plane containing the axes of both the bearing 70 and the shaft 41 at the precise instant each of these images is formed. Since the plane of the dynamic couple is disposed vertically when the axis of the shaft 41 is in the same vertical plane as the axis of bearing 70, the slot 125, through which light must pass vertically to form images A' and C', must now lie in the plane of said dynamic couple.

With images A' and C' thus brought into coincidence, images B' and D' are now being flashed on the scanning screen (Figs. 12 and 13) at the precise moments that the axis of the shaft 41 reaches the opposite extremes of its oscillation. The calibrations provided on the scale 175 are such that with the condition above noted, the distance between images B' and D' constitutes a measure of the number of ounces required in each of the two weights to be applied at diametrically opposite points on the rim of the wheel 58 and on opposite sides of the latter and in the plane of its dynamic couple, to correct the dynamic unbalance of the wheel.

Figure 13:
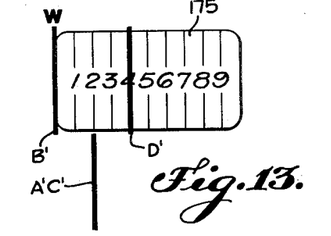
Fig. 13 is a view similar to Fig. 12 and illustrates the same pattern of images shown therein with the measuring chart shifted relative thereto in order to give a correct reading of the number of ounces required in each of the counterbalance weights in order to bring said wheel into balance.

To make it easy to read the amount of this weight the scanning screen 165 is now shifted by rotation of the knob 171 to bring the zero point on the scale 175 into coincidence with the image B' (Fig. 13). In the instance shown in this figure, a pair of weights of four ounces each will make the necessary correction.

Figure 14:
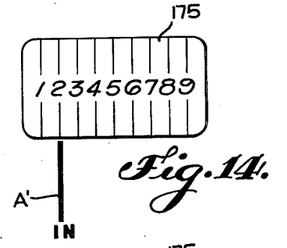
Fig. 14 is a view similar to Fig. 13 illustrating the appearance of a locating image which is produced with the wheel halted, and by which the precise location of said plane of unbalance is determined.

The size of the weights needed for bringing the wheel 58 into dynamic balance having thus been ascertained, the rotation of the wheel is halted and it is then slowly turned by hand until image A' is projected onto the scanning screen as shown in Fig. 14. This indicates that the narrow portion of the slot 125 of the shutter 110 lies in a vertical plane with the large opening 127 of said slot disposed downwardly. This means that the plane of the dynamic unbalance couple in the wheel 58 is also disposed vertically and that by an extension of the pointer 59, the exact point where this plane intersects the rim of the wheel and where the first of the weights is to be applied may be accurately indicated.

Having located this plane in the wheel with the wheel halted and said plane disposed vertically, the question arises as to whether the first weight is to be applied to the inner or outer flange of the rim where said plane intersects the upper half of the wheel. With the machine assembled as shown in the drawings and with the wheel 58, the shaft 41 and shutter 110 rotating in a direction indicated by arrows 190 in Figs. 4, 6, and 10, images A', B', C', and D', are produced in this order so that the production of image D' precedes the production of image A' by 90° of rotation of the wheel 58 in the direction of the arrow 190 which, as diagrammatically suggested in Fig. 10 is with the shutter 110 swung away from the observer.

From the foregoing it is clear that, at the moment image D' is produced, the plane of the dynamic couple is disposed horizontally and that the dominating unbalanced mass of the dynamic couple in the wheel 58 is disposed in the outside portion thereof and lies in the opposite direction from the medial vertical plane of the oscillation than the shutter 110 is disposed when producing image D'. From this fact it may be noted that when image A' is next produced and the plane of the dynamic couple in the wheel 58 has come into vertical position, the dominating mass of said couple is disposed on the outside of the upper half of said wheel so that the weight to be applied to the rim of said wheel in the plane of said couple, where this plane intersects the upper half of the wheel, must be on the inside of the rim. The other correcting weight must, of course, be applied, in the plane of said couple, 180° from the first weight and on the outside of the rim.

It is to be noted that the letter "W" which is made a part of indicia B' correctly suggests to the operator by the position in which indicia B' appears in the pattern shown in Fig. 13, whether the first weight to be applied to the rim where the upper half of this is intersected by the plane of unbalance with the latter disposed vertically, is to be applied in the inside of the wheel or the outside of the wheel. In the pattern shown in Fig. 13 the indicia B' is on the left side of the pattern which indicates that the first weight to be applied in the next following step of the operation, is to go on the left or inside face of the wheel.

Should the shutter 110 be rotated relative to shaft 41, (when bringing indicia A' and C' into superimposed relation) into a position which is 180° away from the position of the shutter which produced the pattern shown in Fig. 13, a pattern of the same character would be produced excepting that indicia B' and D' would exchange places in the pattern. In this case the appearance of indicia B' including the letter "W" on the right side of the pattern would correctly suggest that the first weight to be applied in the next following step of the operation (in which a pattern is produced on the screen as shown in Fig. 14) is to go on the right or outside of the rim at the uppermost point in the latter.

The reason for the major portion of the slot 125 being comparatively narrow and for arranging for the medial indicia 82 comprising the word "in" to be illuminated only by light passing through said narrow portion, is that this causes this indicia to be illuminated and the corresponding image A' to be produced only within a very limited range of rotation of the wheel 58. This results in a relatively accurate location of the plane of the dynamic couple, by the pointer 59.

Another effect of providing for the illuminating of indicia 82 (the word "in"), only by light passing through the narrow portion of slot 125, is that this word is not illuminated sufficiently to be visible on the screen 165 while the wheel is rapidly rotating. This is why it appears only when the wheel is halted (see Fig. 14).

Figure 15:
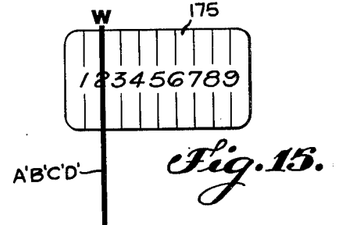
Fig. 15 is a view similar to Fig. 14 and illustrates a pattern of images produced when the rapid rotation of the wheel is resumed after counter balance weights of the right value have been correctly applied thereto, whereby the wheel is brought into dynamic balance.

The dynamic balance of the wheel is now checked by depressing the lever 56 and accelerating the wheel again to approximately 850 R. P. M. If the operation has been accurately performed the wheel will now be in both static and dynamic balance and images A' B' C' and D' will be superimposed as shown in Fig. 15 to form a representation on the scanning screen of the aperture 81 substantially as this appears in the plate 80 although the word "in" will be insufficiently illuminated to be legible.

While I prefer to employ the two diametral slots 120 and 125 in the shutter 110 and produce four illuminations of various portions of the aperture 81 during each revolution of the shaft, with successive illuminations separated by intervals during each of which shaft 41 rotates 90°, it is to be understood that this mode of operation is not indispensable to the invention. Although less desirable, it is optional to employ only a single diametral slot in the shutter such, for instance, as slot 120, and there are two modes of accomplishing the desired ends with one slot.

The first of these modes involves two steps, the first of which is to rotate the shutter 110 relative to the shaft 41 by turning the knob 104 until images B' and D' are spaced a maximum distance apart with image B' on the left. The scanning screen is then shifted to bring the zero line of the scale 175 into coincidence with the left hand one of these images, whereupon the amount of the required weight can be read by the location of the other image on the scale.

Having noted the size of counterweight needed to balance the wheel, the shutter 110 is now rotated in the direction of arrow 190 relative to shaft 41 until images B' and D' coincide on the scanning screen. This means that the slot 120 now lies in the diametral plane of unbalance of the wheel.

Rotation of the wheel is thereupon halted and it is turned slowly and stopped when image B' appears on the scanning screen. This means the diametral plane of unbalance is now vertical. Because of the direction shutter 110 was rotated to achieve coincidence of images B' and D' (from the preceding position of the shutter, in the pattern produced by which image B' was on the left of the pattern) it is also manifest that the first weight to be applied to the wheel is now to go on the inside or left side of the wheel at the top.

The second mode of using slot 120 alone in securing dynamic balance in wheel 58 begins with producing indicia B' and D' with their maximum spacing as these are shown in Fig. 13, to measure the size of the weights needed. It is to be noted that slot 120 now lies at right angles to the plane of the dynamic couple and that indicia B' is being produced at precise moments when the free end of shaft 41 is swung towards the operator, with said plane horizontal, and with the dominant outside mass of said couple swung backwardly with the far half of said wheel.

The wheel is now slowed down and halted with indicia B' projected on the screen. The first weight is now applied to the outside of the rim portion disposed forwardly and in a horizontal axial plane. The second weight is applied in a similar manner to the inside of the rim after the wheel has been rotated 180° to produce indicia D' on the screen.

Figures 17, 19:
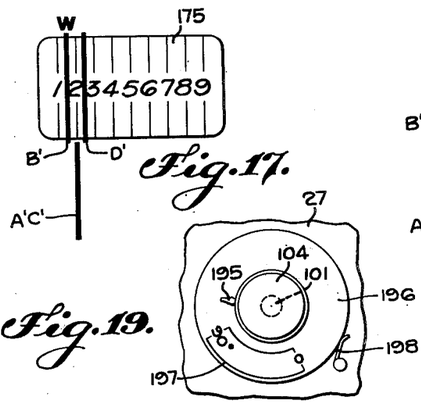
Fig. 17 is a view similar to Fig. 16 and illustrates a pattern of images such as might be produced where the counter-balance weights applied were too light to properly correct the dynamic unbalance of the wheel.
Fig. 19 is a detail plan view of a modified form of apparatus.

When following either of the aforesaid modes of operation in using slot 120 alone to secure dynamic balance in wheel 58, the step of locating images B' and D' at their maximum spacing may be accomplished quicker and more accurately by the following modification of the apparatus and the procedure employing the same:

As shown in Fig. 19, this modification includes a radial pointer 195 fixed on knob 104 and a protractor 196 disposed between the housing 21 and the knob 104 and freely rotatable about the shaft 101. This protractor has a scale 197 which embraces the angle through which the knob 104 must be turned to rotate the shutter 110 exactly 90° with reference to the shaft 41. A detent 198 yieldably holds the protractor in whatever position it is turned to about shaft 101.

With this modified apparatus available, the first step is to turn the knob 104 to bring indicia B' and D' into coincidence. The protractor 196 is now rotated to bring the zero mark of the scale 197 into coincidence with the pointer 195 on knob 104.

The knob 104 is then rotated until said pointer coincides with the 90° mark on the scale 197 indicating that the shutter 110 has been rotated relative to the shaft 41 exactly 90° from the position of the shutter 110 when images B' and D' coincided.

By virtue of the fact that it is much easier to note by visual observation when images B' and D' are superimposed than it is to discern just when the maximum spacing of said images has been accomplished, the maximum spacing of said images can be more rapidly and accurately effected by the foregoing procedure than if the operator should merely rely upon his ability to judge visually when images B' and D' have been brought into maximum spaced relation. Accuracy in this respect is of particular importance when the shutter is not moved from the position given it to produce images B' and D' in their maximum spaced relation, before subsequently slowing the wheel down and depending upon the appearance of image B' to indicate the location horizontally of the plane of the dynamic couple for the purpose of applying counter balance weights in said plane.

Figure 16:
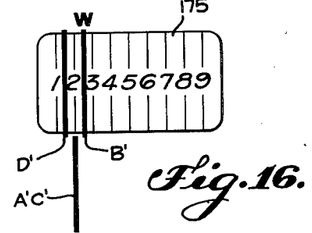
Fig. 16 is a view similar to Fig. 15 and illustrates a pattern of images produced when the counter-balance weights added for correction of the dynamic unbalance of said wheel are too heavy for this purpose.
Figure 18:
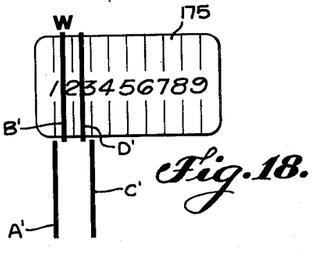
Fig. 18 is a view similar to Fig. 17 and illustrates a pattern of images such as might be produced where the corrective counter-balance weights have not been applied at opposite points on said wheel.

Figs. 16, 17, and 18 illustrate check patterns indicating errors in using the balancer 20.

Fig. 16, for instance, illustrates a check pattern produced where the weights applied are excessive and simply create an opposite condition of unbalance.

The check pattern shown in Fig. 17 is typical of that produced when the weights applied are insufficient to bring the wheel into dynamic balance.

The check pattern illustrated in Fig. 18 is typical of those produced where the correcting weights have not been applied at opposite points on the wheel.

When any check pattern different than that shown in Fig. 15, is produced after weights have been added to the wheel in an attempt to bring this into dynamic balance, the wheel must be halted, the weights removed and the operation done over again with special care to avoid the error indicated in the check pattern.

Whenever the check pattern shown in Fig. 15 is produced, the wheel producing the same is in dynamic balance.

The oscillation of the free end of shaft 41 about the bearing 70 is of course in an arcuate path but inasmuch as the swinging of the arm 72 about this bearing in said oscillation is limited to an arc of approximately one degree, this path of oscillation of the free end of shaft 41 may for all practical purposes be considered as rectilinear. In its broader aspects, the present invention is not limited to the free end of the shaft being restrained in this manner. It might be allowed to oscillate in a shallow ellipse or it might, on the other hand, be restrained by a slideway so that the oscillation would be exactly defined by the term "rectilinear."

Reference in the claims therefore to the free end of shaft 41 being restrained to move in only one plane is to be liberally construed to cover not only restraint to true rectilinear motion but also restraint to a path which approximates rectilinear motion as compared with unrestrained oscillation. When employing the language above referred to as embracing the oscillation of the free shaft end in a shallow arc, subsequent reference to "said plane" may be interpreted as referring to a plane which is the chord of said arc or a plane which is tangent to said arc at the mid point therein.

I claim as my invention:

1. In an instrument for measuring and locating dynamic unbalance in a vehicle wheel, which instrument includes a rigid shaft, means for mounting said wheel on one end of said shaft, means adjacent said mounting means for pivotally and rotatably supporting said shaft, leaving the opposite end of said shaft free to move in at least one plane in response to unbalance, and means for placing said wheel and shaft in rapid rotation, the combination of: a non-rotating plate having a slat; means for moving said plate in unison with the movement of the free end of said shaft in response to dynamic unbalance; means connected with and rotated by said shaft for momentarily directing illumination through said slot at regular intervals in the rotation of said shaft; means to rotate said illumination directing means relative to said shaft for varying the timing between the rotation of said shaft and the occurrence of said illuminations; and means for indicating the positions of said slot at the instants of said illuminations.

2. In an instrument for measuring and locating dynamic unbalance in a vehicle wheel, which instrument includes a rigid shaft, means for mounting said wheel on one end of said shaft, means adjacent said mounting means for pivotally and rotatably supporting said shaft, leaving the opposite end of said shaft free to move in response to unbalance, means for placing said wheel and shaft in rapid rotation and means restraining the free end of said shaft to move in only one plane, the combination of: an opaque plate disposed parallel with said plane and having a slit formed therein; means for moving said plate in unison with the movement of the free end of said shaft and in such manner that said slit is displaced laterally in directions parallel to said plane; means for momentarily illuminating said slit at regular intervals in the rotation of said shaft; means for varying the timing between the rotation of said shaft and the occurrence of said illuminations; and means for indicating the positions of said slit at the instants of said illuminations.

3. In an instrument for measuring and locating dynamic unbalance in a vehicle wheel, which instrument includes a rigid shaft, means for mounting said wheel on one end of said shaft, means adjacent said mounting means for pivotally and rotatably supporting said shaft, leaving the opposite end of said shaft free to move in response to unbalance, means for placing said wheel and shaft in rapid rotation and means restraining the free end of said shaft to move in only one plane, the combination of: an opaque plate mounted to be non-rotatable and parallel with said plane, said plate having a slit formed therein, substantially parallel with said shaft; means for moving said plate in unison with the movement of the free end of said shaft and parallel with said plane to displace said slit laterally; a shutter rotating in synchronism with said shaft and a light source so arranged with respect to said shutter as to illuminate said slit at regular intervals in the rotation of said shaft; means for varying the angular relation between said shutter and said shaft, and means utilizing the light passing through said slit for indicating the positions of said slit at the instants of said illuminations.

4. In an instrument for measuring and locating dynamic unbalance in a vehicle wheel, which instrument includes a rigid shaft, means for mounting said wheel on one end of said shaft, means adjacent said mounting means for pivotally and rotatably supporting said shaft, leaving the opposite end of said shaft free to move in response to unbalance, and means for placing said wheel and shaft in rapid rotation, the combination of: a non-rotatable collar encircling the free end of said shaft to move in unison therewith and restricting movement thereof to a given plane; a plate having a linear slot, said plate being affixed to said collar to be parallel with said plane and in such position that said linear slot is substantially parallel with the axis of said shaft; a light source; a shutter mounted on the free end of said shaft and rotating therewith, said shutter having ports so arranged with respect to said light source as to direct illumination through said linear slot at regular intervals in the rotation of said shaft; means for varying the rotational relation of said shutter with respect to said shaft; and means for indicating the positions of said linear slot at the instants of said illuminations.

5. In an instrument for measuring and locating dynamic unbalance in a vehicle wheel, which instrument includes a rigid shaft, means for mounting said wheel on one end of said shaft, means adjacent said mounting means for pivotally and rotatably supporting said shaft, leaving the opposite end of said shaft free to move in at least one plane in response to unbalance, and means for placing said wheel and shaft in rapid rotation, the combination of: a non-rotating plate having a linear slot; means for moving said plate in unison with the movement of the free end of said shaft in response to dynamic unbalance; means mounted upon said shaft and rotatable therewith for momentarily directing illumination through individual portions of said linear slot at intervals of 180° in the rotation of said shaft; means operably mounted upon said shaft and illumination directing means to effect relative rotation therebetween for varying the timing between the rotation of said shaft and the occurrence of said illuminations; and means for indicating the positions of said linear slot at the instants of said illuminations.

6. In an instrument for measuring and locating dynamic unbalance in a vehicle wheel, which instrument includes a rigid shaft, means for mounting said wheel on one end of said shaft, means adjacent said mounting means for pivotally and rotatably supporting said shaft, leaving the opposite end of said shaft free to move in at least one plane in response to unbalance, and means for placing said wheel and shaft in rapid rotation, the combination of: a non-rotating plate having a linear slot and an identifying perforation associated with said linear slot; means for moving said plate in unison with the movement of the free end of said shaft in response to dynamic unbalance; means mounted upon said shaft and rotatable therewith for momentarily directing illumination through different individual portions of said linear slot exclusive of said identifying perforation at intervals of 180° in the rotation of said shaft; means for illuminating said identifying perforation at intervals of 360° in the revolution of said shaft and with the latter turned midway between the positions thereof at the instants when the aforesaid illuminations occur; means operably mounted upon said shaft and said illumination directing means to effect relative rotation therebetween for varying the timing between the rotation of said shaft and the occurrence of said illuminations; and means for indicating the respective positions of said portions of said linear slot and of said identifying perforation at the instants of said illuminations thereof.

7. In an instrument for measuring and locating dynamic unbalance in a rotating element, which instrument includes a rigid shaft, means for mounting said element on one end of said shaft, means adjacent said mounting means for pivotally and rotatably supporting said shaft, leaving the opposite end of said shaft free to move in at least one plane in response to unbalance, and means for placing said element and shaft in rapid rotation, the combination of: a non-rotating plate disposed parallel with said plane and having a light-transmitting linear slot; means for moving said plate in unison with the movement of the free end of said shaft in response to dynamic unbalance while holding said plate against rotation; shutter means mounted upon said shaft and rotatable therewith for momentarily projecting illumination through said slot at intervals of 180° in the rotation of said shaft; means operably mounted upon said shaft and said shutter means to effect rotative movement therebetween for varying the timing between the rotation said shaft and the occurrence of said illuminations; and calibrated scanning means for indicating the positions of said slot at the instants of said illuminations.

8. In an instrument for measuring and locating dynamic unbalance in a vehicle wheel, which instrument includes a rigid shaft, means for mounting said wheel on one end of said shaft, means adjacent said mounting means for pivotally and rotatably supporting said shaft leaving the opposite end of said shaft free to move in response to unbalance, means for placing said wheel and shaft in rapid rotation and means restraining the free end of said shaft to move in only one plane, the combination of: an opaque plate mounted parallel with said plane for movement in unison with the free end of said shaft, said plate having a slit formed therein substantially parallel with said shaft; a shutter rotating in synchronism with said shaft and comprising an element connected to said shaft and having an opening extending therethrough transversely to the axis of said shaft, a light source so arranged with respect to said shutter as to project illumination through said opening and said slit at intervals of 180° in the rotation of said shaft, means for adjusting the angular relation between said shutter and said shaft, and means utilizing the light passing through said opening and said slit for indicating the positions of said slit at the instants of said illumination.

9. In an instrument for measuring and locating dynamic unbalance in a vehicle wheel, which instrument includes a rigid shaft, means for mounting said wheel on one end of said shaft, means adjacent said mounting means for pivotally and rotatably supporting said shaft leaving the opposite end of said shaft free to move in response to unbalance, means for placing said wheel and shaft in rapid rotation and means restraining the free end of said shaft to move in only one plane, the combination of: an opaque plate mounted parallel with said plane for movement in unison with the free end of said shaft, said plate having a slit formed therein substantially parallel with said shaft, a shutter rotating in synchronism with said shaft and comprising an element connected to said shaft and having two openings at right angles extending therethrough transversely to the axis of said shaft, a light source so arranged with respect to said shutter as to project light through said openings and said slit at intervals of 90° in the rotation of said shaft, means for adjusting the angular relation between said shutter and said shaft, and means utilizing the light passing through said openings and said slit for indicating the positions of said slit at the instants of said illuminations.

10. In an instrument for measuring and locating dynamic unbalance in a rotating element, which instrument includes a rigid shaft, means for mounting said element on one end of said shaft, means adjacent said mounting means for pivotally and rotatably supporting said shaft, leaving the opposite end of said shaft free to move in at least one plane in response to dynamic unbalance of said element, and means for placing said element and shaft in rapid rotation, the combination of: a non-rotating plate disposed parallel with said plane and having a light-transmitting linear perforation; means for moving said plate in unison with the movement of the free end of said shaft in response to dynamic unbalance while holding said plate against rotation; a source of light; shutter means mounted upon said shaft for rotation therewith, said shutter means having a diametral slit projecting illumination from said light source through said perforation at regular intervals in the rotation of said shaft; and a calibrated scanning means to receive the illumination projected through said perforation to indicate the location of the perforation at the instant of illumination.

11. An instrument for measuring and locating dynamic unbalance in a rotating element comprising a shaft, means for mounting the element on one end of said shaft, means supporting said shaft at a point intermediately of its ends for rotation and limited pivotal movement whereby the opposite end of said shaft is free to oscillate in response to dynamic unbalance of said element, a source of light, a non-rotating plate mounted adjacent said opposite end of said shaft for oscillation in unison therewith in the light beam of said light source and having a light-transmitting slit, means on said shaft for projecting said light beam through said light-transmitting slit at regular intervals in the rotation of said shaft, and a screen adapted to receive the light beam projected through said slit to indicate the oscillatory positions of the free end of said shaft at said intervals.

12. An instrument for measuring and locating dynamic unbalance in a rotating element comprising a shaft, means for mounting the element on one end of said shaft, means supporting said shaft at a point intermediately of its ends for rotation and limited pivotal movement whereby the opposite end of said shaft is free to oscillate in response to dynamic unbalance of said element, means for restraining the oscillatory movement of the free end of said shaft to substantially one plane, a light source, a non-rotating plate mounted adjacent said opposite end of said shaft for oscillation in unison therewith in the light beam of said light source and in parallel relation to said plane, said plate having a light-transmitting slit, shutter means on said shaft and periodically operative upon rotation of said shaft to project a beam of light through said light-transmitting slit, and a screen adapted to receive the periodic beam projected through said slit to indicate the oscillatory positions of the free end of said shaft at the instant of projection of said beam through said slit.

JAMES P. CARR.

REFERENCES CITED

The following references are of record in the file of this patent:

UNITED STATES PATENTS

| Number | Name | Date |
|---|---|---|
| 1,949,603 | Davey | Mar. 6, 1934 |
| 2,277,190 | Weaver | Mar. 24, 1942 |
| 2,349,450 | Meinzer | May 23, 1944 |

FOREIGN PATENTS

| Number | Country | Date |
|---|---|---|
| 508,120 | France | July 16, 1920 |
| 195,968 | Great Britain | May 29, 1924 |
| 546,509 | Great Britain | July 16, 1942 |